(12) United States Patent
Kugele

(10) Patent No.: US 11,398,087 B2
(45) Date of Patent: Jul. 26, 2022

(54) EVENT-BASED IDENTIFICATION AND TRACKING OF OBJECTS

(71) Applicant: Robert Bosch GmbH, Stuttgart (DE)

(72) Inventor: Alexander Kugele, Renningen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/020,350

(22) Filed: Sep. 14, 2020

(65) Prior Publication Data

US 2021/0081669 A1   Mar. 18, 2021

(30) Foreign Application Priority Data

Sep. 18, 2019  (DE) .......................... 102019214198.6

(51) Int. Cl.
*G06V 20/10* (2022.01)
*G06T 7/20* (2017.01)
*G06V 20/40* (2022.01)

(52) U.S. Cl.
CPC ............. *G06V 20/10* (2022.01); *G06T 7/20* (2013.01); *G06V 20/40* (2022.01); *G06V 20/44* (2022.01)

(58) Field of Classification Search
CPC ....... H04W 4/02; H04W 4/021; H04W 4/029; H04W 52/0251; H04W 4/46; G06K 9/00013; G06K 9/00201; G06K 9/0061; G06K 9/0063; G06K 9/00791; G06K 9/4661; G06K 9/00664; G06K 9/00711; G06K 2009/00738; G06K 9/00771; G06K 9/00805; G06K 9/6201; G06T 2207/10048; G06T 7/70; G06T 2207/10004; G06T 7/20; G06T 2207/10016; G06T 2207/30261;
(Continued)

(56) References Cited

U.S. PATENT DOCUMENTS 5,170,352 A * 12/1992 McTamaney ........ G05D 1/0236
318/587
5,644,386 A * 7/1997 Jenkins ................... G01S 17/89
356/4.01
(Continued)

OTHER PUBLICATIONS

Coupled Object Detection and Tracking from Static Cameras and Moving Vehicles (Year: 2008).*
(Continued)

*Primary Examiner* — Nizar N Sivji
(74) *Attorney, Agent, or Firm* — Norton Rose Fulbright US LLP; Gerard Messina

(57) ABSTRACT

A method for identifying and/or tracking objects in a spatial area. The method includes observing the area with the aid of at least one event-based sensor, the event-based sensor including light-sensitive pixels, and a relative change of the light intensity incident upon a pixel by at least a predefined percentage prompting the sensor to output an event assigned to this pixel. The method further includes, in response to the sensor, outputting a new event, ascertaining an assessment for this event which is a measure of the extent to which this event matches an already detected distribution of events, and/or of the extent to which it is plausible that the event stems from an already detected object; and in response to the ascertained assessment meeting a predefined criterion, assigning the new event to the already detected distribution, or the already detected object.

18 Claims, 3 Drawing Sheets

(58) Field of Classification Search
CPC .. H04N 13/25; H04N 13/271; H04N 5/23299; H04N 5/2351; G08G 1/161
See application file for complete search history.

(56) References Cited

U.S. PATENT DOCUMENTS

| | | | | |
|---|---|---|---|---|
| 2005/0111698 | A1* | 5/2005 | Kawai | B60R 1/00 382/103 |
| 2009/0262192 | A1* | 10/2009 | Schofield | B60R 1/00 348/148 |
| 2011/0133917 | A1* | 6/2011 | Zeng | G06K 9/6293 340/436 |
| 2014/0327780 | A1* | 11/2014 | Herrli Anderegg | G08B 13/19645 348/159 |
| 2015/0169968 | A1* | 6/2015 | Michmerhuizen | B60R 1/00 348/148 |
| 2016/0096477 | A1* | 4/2016 | Biemer | G06K 9/52 348/148 |
| 2017/0200061 | A1* | 7/2017 | Julian | G06K 9/00845 |

OTHER PUBLICATIONS

Towards Advanced Information Fusion for Driver Assistant Systems of Modern Vehicles (Year: 2008).*
Automated Vehicle System Architecture with Performance Assessment (Year: 2017).*
Low-Power Dynamic Object Detection and Classification With Freely Moving Event Cameras (Year: 2020).*

* cited by examiner

EVENT-BASED IDENTIFICATION AND TRACKING OF OBJECTS

CROSS REFERENCE

The present application claims the benefit under 35 U.S.C. § 119 of German Patent Application No. DE 102019214198.6 filed on Sep. 18, 2019, which is expressly incorporated herein by reference in its entirety.

FIELD

The present invention relates to the identification and tracking of objects in an area based on a visual observation of this area.

BACKGROUND INFORMATION

A human driver steering a vehicle picks up the vast majority of the pieces of information relevant for the driving task using the eyes. Pieces of information from a visual observation of the vehicle surroundings are accordingly also an important source of information for driver assistance systems and systems for the at least semi-automated driving.

A fast response time is extremely important for the avoidance of accidents. Scientific examinations of accidents have shown that a high percentage of the accidents could have been avoided if only a little more time (in most instances no more than one second) had been available for the response.

During the processing of camera images, there are two factors which extend the response time. On the one hand, cameras only update the image at a previously established refresh rate per second. On the other hand, image data streams require a high bandwidth for the transmission within the vehicle.

U.S. Patent Application Publication No. US 2016/096477 A1 expands a conventional image sensor with additional event-based sensor elements. Whenever the light intensity incident upon such an element changes by more than a certain relative amount, the sensor immediately outputs an event, regardless of the refresh rate of the camera.

SUMMARY

Within the scope of the present invention, a method for identifying and/or tracking objects in a spatial area is provided. This method is employable, in particular, for observing the surroundings of a vehicle for the purpose of coping with the driving task. However, it may also be used, for example, for the stationary monitoring of an area for intruders or for unauthorized activities.

In accordance with an example embodiment of the present invention, in the method, the area is observed with the aid of at least one event-based sensor. The event-based sensor includes light-sensitive pixels. A relative change in the light intensity incident upon a pixel by at least one predefined percentage prompts the sensor to output an event assigned to this pixel.

In response to the sensor outputting a new event, an assessment is ascertained for this event to what extent this event matches an already detected distribution of events, and/or to what extent it is plausible that the event stems from an already detected object. In response to the ascertained assessment meeting a predefined criterion, the new event is assigned to the already detected distribution or the already detected object.

The term "detect" does not limit the manner in which the knowledge of the distribution or of the object was obtained. For example, the distribution may be formed of events supplied by the event-based sensor, but may also be obtained from an arbitrary external source. Objects may also be ascertained from images, for example, but may also be reported from another vehicle, for example using vehicle-to-vehicle (V2V) communication.

It was found that, in this way, the events initially only assigned to a location and a time may be provided with a semantic meaning as to which object they stem from. This is an important piece of information for a downstream evaluation which, for example, is to determine whether a certain object in the vehicle surroundings is on a collision course with the host vehicle and the behavior of the host vehicle should be changed accordingly. The considerably faster availability of the events supplied by the event-based sensor compared to camera images is thus accompanied by a loss of semantic information to a considerably lesser degree than in the past.

In particular, it was found that events which stem from one and the same object frequently satisfy a distribution which has certain characteristic properties or parameters. Different objects thus basically impress a "fingerprint" onto the stream of events which originate from them. In this way, events which belong to different objects may even still be distinguished from one another when the corresponding "event clouds" are very close together, or even overlap, in space and time.

Such overlaps may occur, for example, when a road setting is viewed as a two-dimensional projection using a two-dimensional event-based sensor. If, for example, two vehicles are driving next to one another on a road including two lanes per driving direction, and this is observed from the side, the "event clouds" originating from the two vehicles overlap, even though the vehicles themselves do not make contact with one another. The "event clouds," however, are describable by different distributions, in particular, when two vehicles of different types are involved. As a result, they may be differentiated from one another.

Such a differentiation of "event clouds" is, in particular, also possible without precise knowledge of the possible types of objects. An evaluation as to which objects in a setting are moving in which manner thus does not presuppose that the setting is initially semantically segmented by object type.

The assignment of new events to already detected objects does not necessarily presuppose the described path with the aid of distributions, but may advantageously also take place directly. For example, it is possible to derive, from one or multiple image(s) of the observed area, the information as to which objects are present there, and precisely where, in each case at the point of time of the image recording. A spatial-temporal "expectation corridor," in which events, stemming from the object, are presumably situated, may thus be indicated from one or multiple such snapshot(s). There is a very high likelihood that events which are outside this "expectation corridor" do not stem from the particular object. In particular, for example, it is also possible to use a type of the object which is classified from the image, or identified in another manner, for the ascertainment of the "expectation corridor." The rules according to which different types of objects may move in part differ considerably. For example, different types of vehicles have differently large turning circles, which establish the agility with respect to directional changes.

It was furthermore found that, in particular, those events which cannot be assigned to an already detected object, and/or to an already detected distribution, may be particularly important for the ultimate application of an identification or tracking of objects. These events are directly identifiable by the assessment provided within the scope of the method, and may be accordingly prioritized during the further processing to shorten the response time even further.

When, for example, a vehicle is guided through the road traffic, the vast majority of the events supplied by the event-based sensor is not very surprising. When the vehicle is guided through an avenue flanked by trees, for example, the constant change between trees on the one hand, and spaces between them on the other hand, continuously results in a large number of events. Many events which are attributed to the movements of other road users are also predictable from the context of the traffic situation and are not surprising. Such events accordingly also do not require a fast response. It therefore does not come as a big surprise when a vehicle, whose turn signal is blinking on the right and which has initiated a turning process, will continue this turning process.

In contrast, a fast response, in particular, to unexpected events may be very important. For example, a pedestrian may suddenly appear at the margin of the observation area, who intends to step onto the roadway, or a ball suddenly flying into the observation area and onto the roadway may be a warning that a child will run into the roadway soon. Such events may justify a full brake application, and in this situation, it is very advantageous when the processing capacities are not taken up by predictable routine events.

In the context of the stationary monitoring of areas for intruders or unauthorized activities, the distinction between events which stem from known objects on the one hand, and unknown objects on the other hand, may mitigate the conflict of objectives between the alarm sensitivity and the risk for false alarms. For example, in the case of heavy wind, the top of a tree in the monitored area may produce many events, which could be misinterpreted as movements of an intruder and trigger a false alarm. If now only the sensitivity of the monitoring system with respect to movements is reduced, this may cause an intruder to be able to sneak through the monitored area and remain below the alarm threshold. If, in contrast, only the events stemming from the known treetop are suppressed, the full sensitivity remains available for the identification of the intruder.

In one particularly advantageous embodiment of the present invention, an updated position, an updated speed, and/or an updated movement direction, of the object is/are ascertained in response to a new event being assigned to an already detected object and/or a distribution of events belonging to an already detected object, taking this new event into consideration. In this way, the position, the speed, and/or the movement direction may be updated with a particularly short response time, and sudden changes may be identified quickly.

For example, the aforementioned preceding vehicle, which has started a turning process to the right, is required to wait compared to road users who want to continue straight-ahead. A dangerous situation may arise when those road users, for whom the turning vehicle has to wait, are not visible from the following vehicle. From the perspective of this following vehicle, the stopping of the turning vehicle comes as a complete surprise and necessitates fast braking to avoid a rear-end collision.

In response to the establishment that a number of events do not match any already detected distribution of events, but form a new distribution in accordance with a predefined criterion, this new distribution is detected in one further particularly advantageous embodiment. In this way, it may at least already be established that an object has newly appeared in the observed setting, or has started to move. This is initially the most important information, in particular with respect to the avoidance of collisions in road traffic; what object exactly is involved is initially secondary.

In one further particularly advantageous embodiment of the present invention, at least one image of objects present in the observed area is ascertained in response to a new distribution being detected, and/or a number of events not matching any already detected distribution meeting another predefined criterion. The predefined criterion may state, for example, that a minimum number of non-assignable events has to be present before the ascertainment of an image is triggered. As described above, the image may, in particular, be used to assign "event clouds" of specific objects in the observed setting. Furthermore, one or more image(s) may be used to establish "expectation corridors" for new events supplied by the event-based sensor.

The image may, for example, be detected with the aid of an image sensor divided into light-sensitive pixels, which, for each pixel, outputs a measure of the light intensity incident upon this pixel. By only retrieving images from the image sensor when needed, and not continuously, the available capacity for the data transmission during the majority of the time may be kept free for events which necessitate a fast response.

As an alternative, or also in combination therewith, however, the image may also be ascertained, for example, taking already detected events into consideration. Ultimately, each event registered by the image-based sensor may be used as an update of an instantaneous state represented by a previously recorded image. This means that an image, which represents an instantaneous state at a later point in time, may be generated from the preceding image and the events which have accrued in the meantime. This later point in time is freely selectable and, in particular, not bound to a grid predefined by a fixed refresh rate.

It is also possible to solely construct an image from detected events. For this purpose, for example, all events occurring in a certain spatial and temporal window may be added up. Even if this should only generate rough outlines of objects, the objects may possibly already be identified from an image thus obtained.

Furthermore, it is particularly easy, taking the events which have accrued in the meantime into consideration, to ascertain the image selectively for a portion of the observed area. This may, in particular, be the portion from which the events which prompted the ascertainment of the image stem. As described above, the majority of the setting is made up of routine information, in particular, in road traffic and during the stationary monitoring of areas for security purposes. By asking only for a portion of an image, which presumably includes new and surprising information, transmission bandwidth and computing capacity are saved.

The image may, in particular, be used, for example, to assign the new distribution, and/or the number of events not matching any already detected distribution, to at least one object. As a result, ever greater fractions of the overall accrued events may incrementally be explained with the presence, or the movement, of objects.

In one further particularly advantageous embodiment of the present invention, from a number of events which form a new distribution, and/or from a number of events not matching any already detected distribution which meets another predefined criterion, a position, a speed, and/or a movement direction, of at least one object with which these events are consistent is/are ascertained. It does not have to be known in the process what type of object is specifically involved. The object may thus, as described above, initially be treated as an abstract something, of which it is initially only known where it is and/or how it is moving. As described above, the object may be specified in more detail at a later point in time, for example based on an image.

As described above, the identification and/or tracking of objects is an intermediate product in many technical applications. The effect to be ultimately achieved in the application is to take this intermediate product into consideration in order to activate the respective technical system in a manner which is appropriate for the particular situation. In one further particularly advantageous embodiment, an activation signal is thus ascertained from at least one assignment of events to an object and/or a distribution, and/or from at least one position, movement direction and/or speed of at least one object ascertained based on events. A vehicle, and/or a monitoring system for monitoring the spatial area, is/are activated using the activation signal.

For example, in response to the establishment that a predicted trajectory in space and time of an object, of whatever kind, intersects the present or planned trajectory of a host vehicle, the trajectory of this host vehicle may be changed by an intervention into a vehicle dynamics system of the vehicle in such a way that it no longer intersects the predicted trajectory of the object.

For example, in the response to the establishment that an intruder is moving in an area monitored for security purposes, or that other unauthorized activities are taking place there, a perceptible and/or a silent alarm may be triggered, and/or further technical measures for suppressing the unauthorized activities may be triggered. If, for example, an intruder or an unauthorized activity is established on the premises of a car dealership, the immobilizers of all vehicles parked there may be locked, for example, so that it is no longer possible to start the vehicles using the keys stored in the car dealership.

As described above, the distinction between events which are to be assigned to known objects or distributions on the one hand, and surprising events which cannot be assigned to the known objects or distributions on the other hand, may provide a useful prioritization of the events, especially for applications in which a fast response matters. The present invention thus also relates to a system for activating a vehicle, and/or a monitoring system for monitoring a spatial area, which is designed for such a prioritization.

The system includes at least one event-based sensor as well as at least one assessment module. The assessment module is designed to ascertain an assessment, for an event output by the event-based sensor, to what extent this event matches an already detected distribution of events, and/or to what extent it is plausible that the event stems from an already detected object.

Furthermore, at least one activation module is provided. This activation module is designed to form an activation signal from at least one assignment of events to an object and/or a distribution, and/or from at least one position, movement direction, and/or speed of at least one object ascertained based on events, and to activate the vehicle, or the monitoring system, using this activation signal.

Furthermore, an interface module is provided, which is designed to transmit events output by the event-based sensor to the activation module. The interface module is designed to increase the priority given to an event during the transmission to the activation module, the less the event demonstrably matches the assessment by the assessment module for an already detected distribution, or for an already detected object.

This means that the priority with which the event is forwarded to the activation module is higher, the "more unknown" it is in relation to the already detected (=known) events and distributions. As described above, this has the effect that the activation module is then able to respond particularly quickly, in particular, to the surprising events.

A module is, in particular, understood to mean any self-contained functional unit which is designed to carry out a certain task (such as ascertaining an assessment or an activation signal or transmitting the events) at an input of a certain type (such as events, for example). Such a module may be implemented in hardware (for example in the form of a processing unit localized on a chip), in a software routine, or by an arbitrary cooperation of hardware and software.

In one particularly advantageous embodiment, the activation module is additionally designed to communicate already detected distributions and objects to the assessment module. The assessment module is then continuously up-to-date as to which events with respect to the particular technical application are still considered surprising, and which events have become routine during the course of the operation of the system.

In one further particularly advantageous embodiment, the interface module is connected via a CAN bus of the vehicle to the activation module. Since the CAN bus typically extends across the entire vehicle, it is possible in this way to connect multiple event-based sensors, which detect different subareas of the vehicle surroundings, particularly easily. In this regard, it especially pays off that the available transmission bandwidth primarily benefits the transmission of surprising events. Even a high-speed CAN bus only has a bandwidth of 1 Mbit/s, which the described system for the activation of the vehicle based on events also has to share with a plurality of systems already present in the vehicle anyhow.

The methods may, in particular, be entirely or partially computer-implemented. The present invention thus also relates to a computer program including machine-readable instructions which, when they are executed on one or multiple computer(s), prompt the computer(s) to carry out one of the described methods. Within this meaning, control units for vehicles and embedded systems for technical devices, which are also able to execute machine-readable instructions, are to be regarded as computers.

The present invention also relates to a machine-readable data carrier and/or to a download product including the computer program. A download product is a digital product transmittable via a data network, i.e., downloadable by a user of the data network, which may be offered for immediate download in an online shop, for example.

Furthermore, a computer may be equipped with the computer program, with the machine-readable data carrier and/or with the download product.

Further measures improving the present invention are shown hereafter in greater detail together with the description of the preferred exemplary embodiments of the present invention based on the figures.

DETAILED DESCRIPTION OF EXAMPLE EMBODIMENTS

Figure 1:
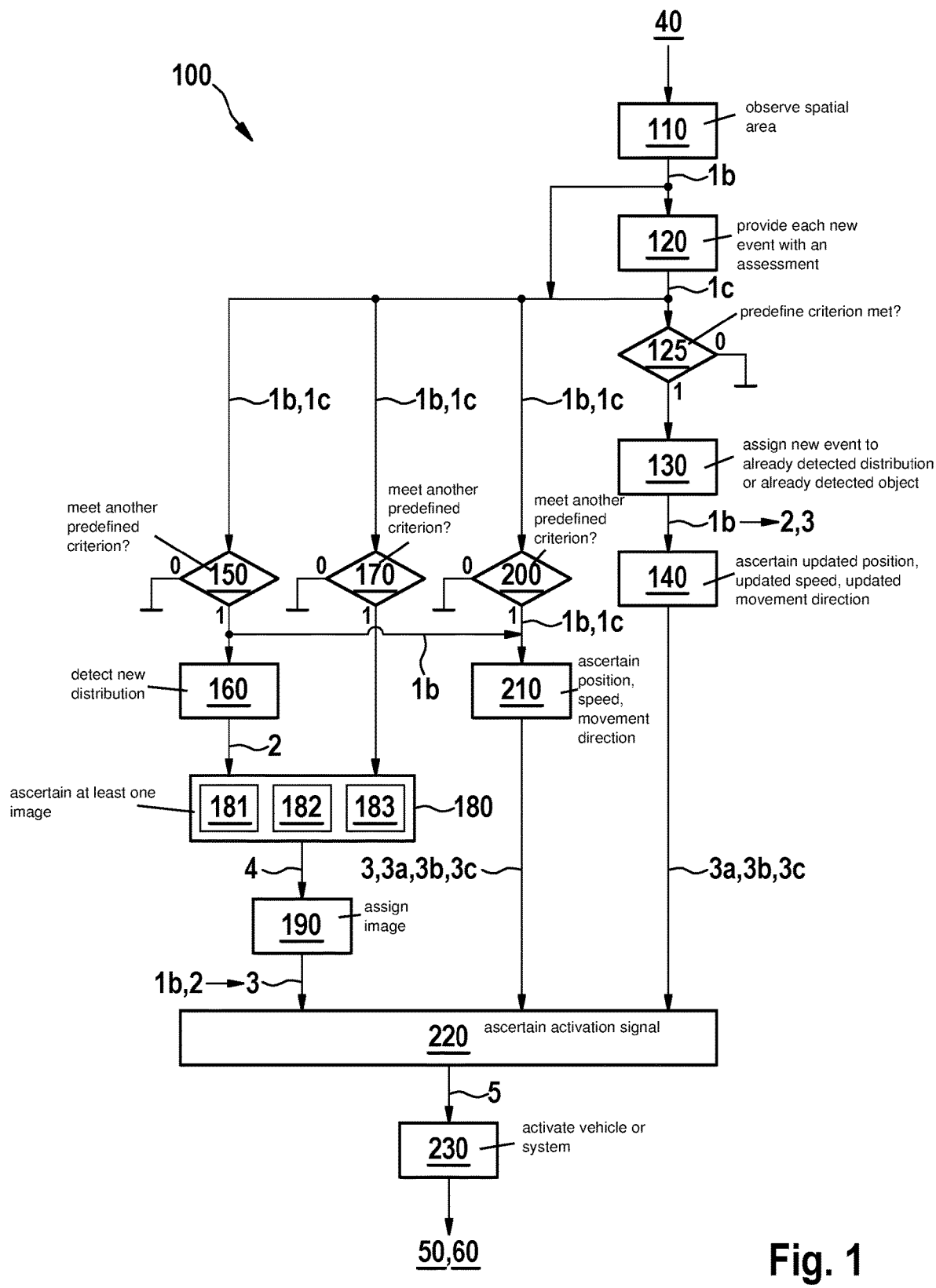
FIG. 1 shows an exemplary embodiment of method 100 in accordance with the present invention.

FIG. 1 is a flow chart of one exemplary embodiment of method 100. In step 110, a spatial area 40 is observed with the aid of at least one event-based sensor 1. Event-based sensor 1 outputs events 1b. In step 120, each new event 1b is provided with an assessment 1c. This assessment 1c is a measure of the extent to which event 1b matches an already detected distribution 2 of events 1b, and/or of the extent to which it is plausible that event 1b stems from an already detected object 3.

In response to the ascertained assessment 1c meeting a predefined criterion 1c, the new event 1b is assigned to already detected distribution 2 or already detected object 3. In step 140, an updated position 3a, an updated speed 3b, and/or an updated movement direction 3c, of object 3 is/are then ascertained, taking this new event 1b into consideration.

It will not be possible to assign all new events 1b output by event-based sensor 1 to already detected distributions 2 or objects 3. For example, a completely new object 3 may suddenly enter the detection range of sensor 1 at any time.

If necessary, the establishment may be made that, even though a number of events 1b do not match any already detected distribution 2 of events 1b, it, in turn, forms a new distribution (truth value 1) in accordance with a predefined criterion 150. In step 160, this new distribution 2 is then detected.

This, or also the establishment that a number of events 1b not matching any already detected distribution 2 meets another predefined criterion 170 (truth value 1), may be taken as a reason to ascertain, in step 180, at least one image 4 of objects 3 present in observed area 40. If, for example, a certain number of events 1b is present, which cannot be assigned, this may trigger a need for clarification as to which object 3 these events 1b stem from.

Image 4 may be procured from any arbitrary source. For example, image 4 according to block 181 may be detected with the aid of an image sensor divided into light-sensitive pixels, which outputs, for each pixel, a measure of the light intensity incident upon this pixel. As an alternative, or also in combination therewith, image 4 according to block 182 may be ascertained, taking already detected events 1b into consideration, for example as an update of a previously recorded image 4.

Image 4 may, in particular, for example according to block 183, be selectively ascertained for a portion of observed area 40 from which events 1b, which were the reason for the ascertainment of image 4, stem.

Based on image 4, in step 190, the new distribution 2, and/or the number of events 1b not matching any already detected distribution 2, may be assigned to at least one object 3.

If, initially, non-assignable events 1b form a new distribution 2, and/or meet another predefined criterion 200 (truth value 1), a position 3a, a speed 3b, and/or a movement direction 3c, of at least one object 3 with which these events 1b are consistent, may be ascertained from these events 1b in step 210. As described above, this object 3 may be regarded as an abstract something, about which nothing other than its position 3a and its kinematics 3b, 3c is known.

Any information obtained during the course of method 100, such as assignments of events 1b to distributions 2 or objects 3, as well as positions 3a, speeds 3b and/or movement directions 3c of objects 3, may be used in step 220 to ascertain an activation signal 5. This activation signal 5 may, in particular, be designed in such a way that, upon activation of a vehicle 50, or of another system 60 for monitoring spatial area 40, with the aid of this activation signal, vehicle 50, or system 60, responds appropriately to the setting detected with the aid of event-based sensor 1 in area 40. In step 230, vehicle 50, or system 60, may be activated with the aid of this activation signal 5.

Figure 2:
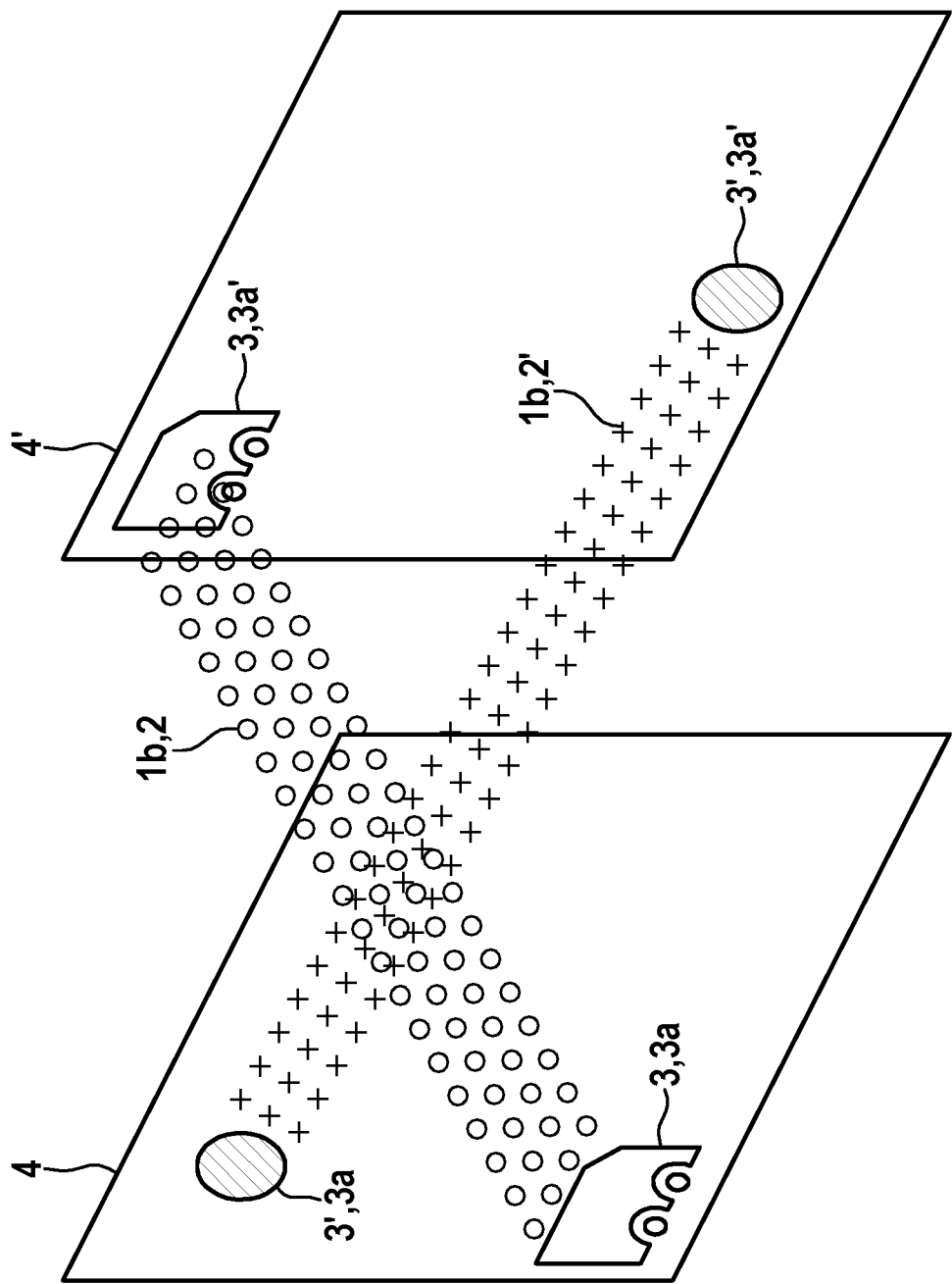
FIG. 2 shows exemplary distributions 2, 2' of events 1b stemming from two different objects 3, 3'.

FIG. 2 clarifies by way of example how events 1b may be assigned to distributions 2, 2', and thus ultimately to objects 3, and how this assignment may be facilitated by the recording of images 4.

The setting outlined by way of example in FIG. 2 includes a moving vehicle as object 3, and an also moving ball as object 3'. Images 4, 4' shown in FIG. 2 represent snapshots of the setting at different points in time. At the point in time of the recording of first image 4, vehicle 3 and ball 3' are each situated in positions 3a. At the point in time of the recording of second image 4', vehicle 3 and ball 3' are each situated in new positions 3a'.

During the movement from positions 3a to positions 3a', objects 3 and 3' prompt event-based sensor 1 to output a plurality of events 1b. Events 1b stemming from vehicle 3 form a first distribution 2, which is characterized by certain properties. The events stemming from ball 3' form a second distribution 2', which is characterized by other properties. When new events 1b are registered, it is thus possible, for example, using arbitrary statistical tests, to check whether these events 1b match first distribution 2, second distribution 2' or neither of the two distributions 2 and 2'.

Regardless, positions 3a and 3a', in which objects 3, 3' are situated in each case in images 4 and 4', in conjunction with points in time at which images 4 and 4' were recorded, each define "expectation corridors" in space and time, in which respective events stemming from these objects 3, 3' should be.

Figure 3:
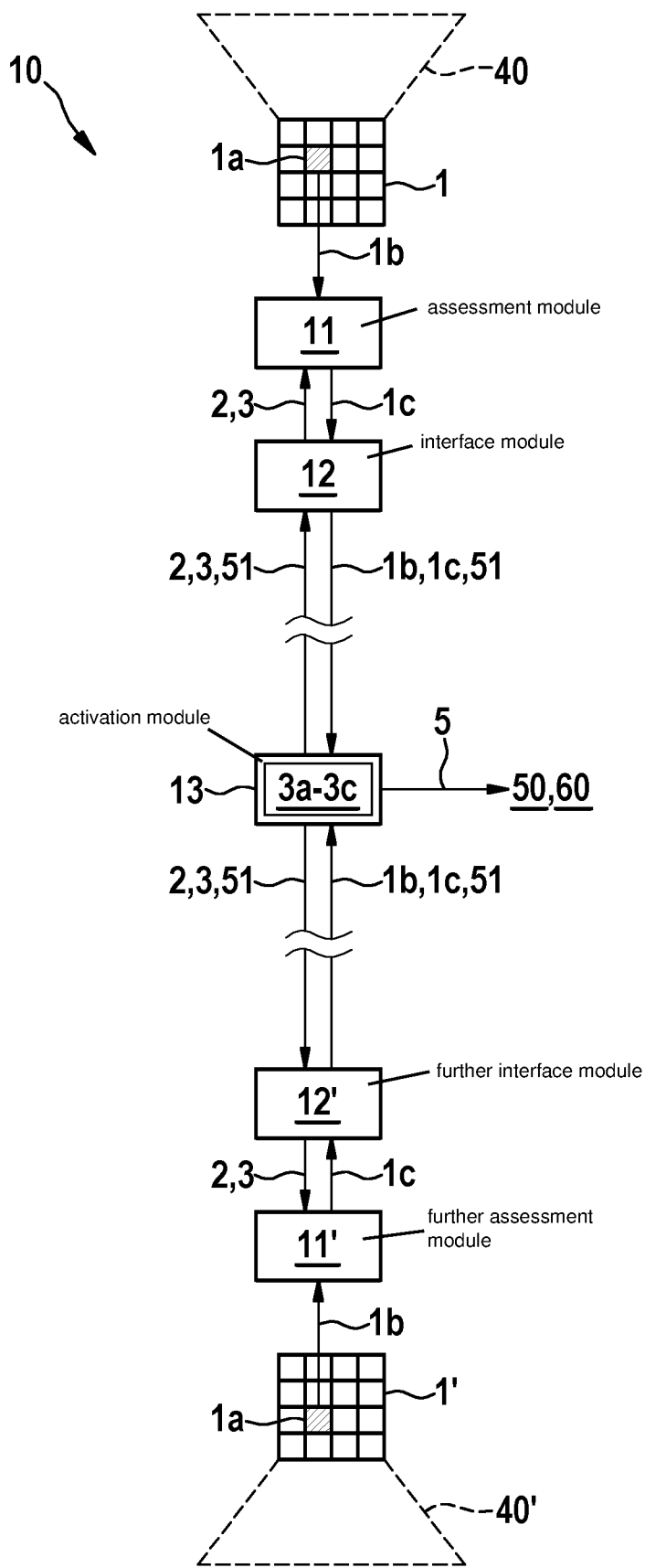
FIG. 3 shows an exemplary embodiment of system 10 for activating a vehicle 50, and/or a monitoring system 60, in accordance with the present invention.

FIG. 3 shows an exemplary embodiment of a system 10 for activating a vehicle 50, and/or a monitoring system 60 for monitoring a spatial area 40.

System 10 includes an event-based sensor 1 for observing area 40. Sensor 1 is divided into light-sensitive pixels 1a and, as described above, in the event of changes of the light intensity incident upon a pixel 1a, outputs a respective event 1b assigned to this pixel 1a.

An assessment module 11 ascertains respective assessments 1c for new events 1b as to the extent to which these events 1b match already detected distributions 2 and/or objects 3. Together with their assessments 1c, events 1b are forwarded via an interface module 12 to an activation module 13. Activation module 13 forms an activation signal 5 and thus activates vehicle 50, or monitoring system 60.

The forwarding of events 1b to activation module 13 is prioritized by interface module 12 based on assessments 1c. The more surprising and unexpected an event 1b is in light of the already detected distributions 2 or objects 3, the greater is the likelihood that a fast response thereto is necessary, and the higher is the priority during the forwarding to activation module 13. This is, in particular, advantageous when interface module 12 communicates with activation module 13 via a link having limited bandwidth, such as, for example, via CAN bus 51 of vehicle 50 or via a radio link. For example, there are limitations with respect to the transmission time component (duty cycle) per unit of time (approximately per hour) for certain short-range radio links in the 868 MHz band. If, at a point in time at which a new surprising object 3 manifests itself in surprising events 1b, the transmission time allowance had already been consumed for events 1b stemming from known objects 3, the surprising events 1b would have to be held back until a new transmission time allowance comes up.

The information as to which distributions 2 or objects 3 are already known is fed back to assessment module 11 by activation module 13. In this way, the fraction of surprising events 1b tends to become increasingly less during the operation. In particular, for example, CAN bus 51 of vehicle 50 may also be used for this play-back.

In the example shown in FIG. 3, there is a further event-based sensor 1' including an associated assessment module 11' and interface module 12'. Further sensor 1' as well as further modules 11' and 12' function as described above, however a different area 40' (for example a different portion of the vehicle surroundings) is observed.

What is claimed is:

1. A method for identifying and/or tracking objects in a spatial area, comprising the following steps:
   observing the area using at least one event-based sensor by which the sensor outputs a plurality of events, the event-based sensor including light-sensitive pixels, wherein, for each of the pixels, a respective relative change of light intensity incident upon the respective pixel of the sensor, by at least a predefined percentage, prompts the sensor to output a respective one of the events assigned to the respective pixel;
   identifying one or more subsets of the plurality of events as each forming a respective single event distribution;
   based on the identified one or more subsets of the plurality of events, determining, for each of the one or more subsets, a respective spatial-temporal expectation corridor for the respective single event distribution formed by the respective subset of the plurality of events;
   ascertaining, subsequent to the identifying of the one or more subsets of the plurality of events and in response to the sensor outputting a new event, an assessment for the new event, which is a measure of, for each of the one or more subsets, an extent to which the new event fits the respective spatial-temporal expectation corridor determined for the respective subset; and
   assigning, in response to the ascertained assessment meeting a predefined criterion for one of the one or more subsets, the new event to the single event distribution identified for the one of the one or more subsets.

2. The method as recited in claim 1, wherein, based on the assignment of the new event, an updated position, an updated speed, and/or an updated movement direction of an object to which the single event distribution identified for the one of the one or more subsets corresponds is ascertained.

3. The method as recited in claim 1, further comprising, in response to establishing that a number of events fit none of the determined respective spatial-temporal expectation corridors, forming a new single event distribution to which the number of events are assigned.

4. The method as recited in claim 3, wherein, in response to the forming of the new single event distribution and/or in response to a predefined threshold number of events fitting none of the determined respective spatial-temporal expectation corridors, actuating an image sensor to perform image detection.

5. The method as recited in claim 4, wherein the image detection is performed using an image sensor that is divided into light-sensitive pixels and that outputs, for each of the pixels of the image sensor, a measure of light intensity incident upon the respective pixel.

6. The method as recited in claim 4, wherein a manner in which the image detection is performed is selected based on the events previously output by the event-based sensor.

7. The method as recited in claim 4, wherein the image detection is selectively performed for a portion of the observed area to which the predefined threshold number of events corresponds.

8. The method as recited in claim 4, wherein, based on the image, the new single event distribution and/or the predefined threshold number of events is assigned to at least one object.

9. The method as recited in claim 1, further comprising, from a number of events which (1) form a new distribution and/or fitting none of the determined respective spatial-temporal expectation corridors and (2) meet another predefined criterion, ascertaining a position, a speed, and/or a movement direction of at least one object with which the number of events are consistent.

10. The method as recited in claim 1, further comprising:
    ascertaining an activation signal from (i) at least one assignment of the events output by the sensor to an object and/or to a corresponding event distribution, and/or (ii) at least one position, movement direction, and/or speed of at least one object ascertained based on the events output by the sensor; and
    activating, using the activation signal, a vehicle and/or a monitoring system for monitoring the spatial area.

11. The method as recited in claim 1, further comprising prioritizing a first sub-region of the area for performance of image detection over a second sub-region of the area based on one or more new events, which fits none of the determined respective spatial-temporal expectation corridors, being output by the sensor for the first sub-region and not for the second sub-region.

12. The method as recited in claim 1, further comprising actuating an image sensor to perform image detection of at least a portion of the area in response to output by the event-based sensor of an event that is determined to fit none of the determined respective spatial-temporal expectation corridors.

13. A system for activating a vehicle, and/or a monitoring system for monitoring a spatial area, comprising:
    at least one event-based sensor that is configured to observe the spatial area to output a plurality of events and that includes light-sensitive pixels, wherein:
       for each of the pixels, a respective relative change of light intensity incident upon the respective pixel of the sensor, by at least a predefined percentage, prompts the sensor to output a respective one of the events assigned to the respective pixel;
       the system is configured to identify one or more subsets of the plurality of events as each forming a respective single event distribution;
       for each of the one or more subsets, the system is configured to determine, based on the identified one or more subsets of the plurality of events, a respective spatial-temporal expectation corridor for the respective single event distribution formed by the respective subset of the plurality of events; and
    at least one assessment module configured to:
       ascertain, subsequent to the identifying of the one or more subsets of the plurality of events and in response to the sensor outputting a new event, an assessment, for the new event, which is a measure of, for each of the one or more subsets, an extent to which the event fits the respective spatial-temporal expectation corridor determined for the respective subset; and assign, in response to the ascertained assessment meeting a predefined criterion for one of the one or more subsets, the new event to the single event distribution identified for the one of the one or more subsets.

14. The system as recited in claim 13, further comprising:
an activation module configured to:
form an activation signal: (i) from the assignment, and/or (ii) from at least one position, movement direction, and/or speed, of at least one object ascertained based on the events; and
use the activation signal to activate the vehicle or the monitoring system; and
an interface module configured to transmit the events output by the at least one event-based sensor to the activation module, the interface module being configured to increase a priority given to a respective one of the events during the transmission to the activation module the less the respective one of the events (i) fits the determined respective spatial-temporal expectation corridors or (ii) is assignable to an already detected object.

15. The system as recited in claim 14, wherein the activation module is further configured to communicate, to the assessment module, already detected distributions and objects.

16. The system as recited in claim 14, wherein the interface module is connected via a CAN bus of the vehicle to the activation module.

17. A non-transitory machine-readable data carrier on which is stored a computer program for identifying and/or tracking objects in a spatial area, the computer program, when executed by a computer, causing the computer to perform the following steps:
observing the area using at least one event-based sensor by which the sensor outputs a plurality of events, the event-based sensor including light-sensitive pixels, wherein, for each of the pixels, a respective relative change of light intensity incident upon the respective pixel of the sensor, by at least a predefined percentage, prompts the sensor to output a respective one of the events assigned to the respective pixel;
identifying one or more subsets of the plurality of events as each forming a respective single event distribution;
based on the identified one or more subsets of the plurality of events, determining, for each of the one or more subsets, a respective spatial-temporal expectation corridor for the respective single event distribution formed by the respective subset of the plurality of events;
ascertaining, subsequent to the identifying of the one or more subsets of the plurality of events and in response to the sensor outputting a new event, an assessment for the new event, which is a measure of, for each of the one or more subsets, an extent to which the new event fits the respective spatial-temporal expectation corridor determined for the respective subset; and
assigning, in response to the ascertained assessment meeting a predefined criterion for one of the one or more subsets, the new event to the single event distribution identified for the one of the one or more subsets.

18. A computer configured to identify and/or track objects in a spatial area, the computer configured to:
observe the area using at least one event-based sensor by which the sensor outputs a plurality of events, the event-based sensor including light-sensitive pixels, wherein, for each of the pixels, a respective relative change of light intensity incident upon the respective pixel of the sensor, by at least a predefined percentage, prompts the sensor to output a respective one of the events assigned to the respective pixel;
identify one or more subsets of the plurality of events as each forming a respective single event distribution;
based on the identified one or more subsets of the plurality of events, determine, for each of the one or more subsets, a respective spatial-temporal expectation corridor for the respective single event distribution formed by the respective subset of the plurality of events;
ascertain, subsequent to the identifying of the one or more subsets of the plurality of events and in response to the sensor outputting a new event, an assessment for the new event, which is a measure of, for each of the one or more subsets, an extent to which the new event fits the respective spatial-temporal expectation corridor determined for the respective subset; and
assign, in response to the ascertained assessment meeting a predefined criterion for one of the one or more subsets, the new event to the single event distribution identified for the one of the one or more subsets.

* * * * *